(12) United States Patent
Potts

(10) Patent No.: US 6,485,647 B1
(45) Date of Patent: Nov. 26, 2002

(54) METHOD AND APPARATUS FOR TREATING LEACH FIELDS

(76) Inventor: David A. Potts, 385 Roast Meat Hill Rd., Killingworth, CT (US) 06419

( * ) Notice: Subject to any disclaimer, the term of this patent is extended or adjusted under 35 U.S.C. 154(b) by 0 days.

(21) Appl. No.: 09/526,381

(22) Filed: Mar. 16, 2000

Related U.S. Application Data

(60) Provisional application No. 60/125,070, filed on Mar. 17, 1999.

(51) Int. Cl.[7] .................................................. C02F 3/00
(52) U.S. Cl. ........................ 210/616; 210/620; 210/747; 210/150; 210/170
(58) Field of Search ............................... 210/616, 620, 210/747, 150, 170; 405/36, 43–49

(56) References Cited

U.S. PATENT DOCUMENTS

| | | | |
|---|---|---|---|
| 2,432,887 A | 12/1947 | Haviland | 210/6 |
| 3,564,854 A | 2/1971 | Berthold | 61/13 |
| 3,698,194 A | 10/1972 | Flynn | 61/11 |
| 3,907,679 A | 9/1975 | Yost | 210/70 |
| 3,951,804 A | 4/1976 | Smith | 210/170 |
| 4,013,559 A | 3/1977 | Johnson | 210/151 |
| 4,021,338 A | 5/1977 | Harkin | 210/63 |
| 4,333,831 A | 6/1982 | Petzinger | 210/170 |
| 4,588,325 A | 5/1986 | Seefert | 405/46 |
| 4,826,601 A * | 5/1989 | Spratt et al. | 210/610 |
| 5,382,363 A | 1/1995 | Boylen | 210/605 |
| 5,547,589 A * | 8/1996 | Carroll, II | 166/305.1 |
| 5,588,777 A | 12/1996 | Laak | 405/40 |
| 5,597,264 A | 1/1997 | Laak | 405/36 |
| 5,766,475 A * | 6/1998 | Mayer et al. | 210/104 |
| 5,827,010 A | 10/1998 | Hassett | 405/36 |

FOREIGN PATENT DOCUMENTS

JP 11-216441 A1 * 8/1999

OTHER PUBLICATIONS

A. P. Bernhart "Treatment and Disposal of Wastewater from Homes by Soil Infiltration and Evapotranspiration", vol. 1, 2nd Ed., University of Toronto Press (1973); pp. 1–7, 22–31, 47–51, 128–131, 158–159, 168–169.
P. Warshall, "Septic Tank Practices", Mesa Press (1976) pp. 1,2,42, 43.

* cited by examiner

Primary Examiner—Chester T. Barry
(74) Attorney, Agent, or Firm—C. G. Nessler

(57) ABSTRACT

The functioning of the leach field of a septic tank type sewage system is maintained or rejuvenated by flowing air or other active gas through the system's conduits, for instance, leaching chambers or perforated pipes in stone filled trenches. Differential pressure created by an air mover forces air or other active gas to flow through the soil adjacent the conduits, to an extent sufficient to push water from any saturated soil and effect desirable aerobic biochemical conditions in the soil. In alternate embodiments, conduits may be pressurized or evacuated. Valves and other plumbing are provided to control air flow and enable continued function of the sewage system during air flow treatment. Auxiliary piping, buried adjacent the trenches of the leach field, is pressurized or evacuated to cause air flow through the soil and or the conduits of the leach field.

23 Claims, 6 Drawing Sheets

METHOD AND APPARATUS FOR TREATING LEACH FIELDS

This application claims benefit of Provisional application Serial No. 60/125,070, filed Mar. 17, 1999.

TECHNICAL FIELD

The present invention relates to the subsurface disposal of sewage and waste water, in particular, to disposal of sewage by means of septic tank type systems and associated leach fields.

BACKGROUND ART

Subsurface sewage disposal systems, commonly called septic tank systems or septic systems, are widely used for on-site processing of sewage from dwellings and other smaller volume sewage sources. Typically, sewage is delivered via a sewer line to a septic tank for primary processing. The septic tank effluent, or wastewater, is flowed to a leaching system for secondary processing by means of distribution pipes. The leaching system, also commonly called a disposal field, leach field, or infiltration field, typically comprises permeable soil of the earth and some sort of excavation in the soil which is filled with stone particulate such as crushed stone or coarse gravel (typically 2.5 cm in dimension) and or a mechanical component, the function of which is to convey wastewater through a conduit, to infiltrate it into the soil.

The principal function of the septic tank is to effect primary sewage processing by engendering physical separation and retention of solids which are lighter and heavier than water, typically by settling and baffling. Solids which settle out as sludge are mostly decomposed by action of bacteria in a typically anaerobic environment. Gases which are generated in the process are vented to atmosphere. The wastewater from the septic tank is typically conveyed to the leach field by passing it through a distribution box and piping which channels wastewater to the leach field trenches, in a predetermined fashion. The wastewater is supposed to be free of solids of significant size. It will contain suspended solids of fine size, micro-organisms such as bacterium and viruses, and various chemical constituents.

The purpose of the leach field is generally to cause the wastewater to be treated or renovated, so it can be benignly returned to the hydrologic cycle which characterizes the movement of water into, through, and from soil beneath the surface of the earth. What follows is a simplified version of certain conventional ways of looking at leach field operation phenomena, to provide a conceptual framework for appreciating the invention. It is not intended to be comprehensive nor limiting.

As the wastewater travels from within a leach trench and through the soil in a properly functioning system, it is subjected to natural chemical and biological processes within a "zone of influence", which may extend 30–120 cm from the trench interface with the soil. A traditional leach field is comprised of a trench filled with small (2–3 cm) stone pieces. A perforated pipe runs through the stone, delivering the wastewater along the trench. A popular modern type of leach field comprises a series of interconnected arch shaped molded plastic chambers having perforated walls, such as leaching chambers sold under the Infiltrator brand name. See U.S. Pat. No. 5,401,116 of J. Nichols, and U.S. Pat. No. 5,511,903 of J. Nichols et al. Typically, Infiltrator® chambers are directly buried in a trench in substitution of the stone-and-pipe leaching device.

The leach field must have sufficient capacity to receive and properly process the anticipated flow of wastewater. The steady state capacity, or the infiltration rate, of a leach field is a function of the resistance to wastewater flow of the surfaces of the trench and the surrounding soil, as such may be influenced by hydraulic phenomena other than permeability, such as capillary action. For illustration here, only the sidewall of the trench will be now discussed. If distilled water is processed in sterile soil of a leach field, the infiltration rate is purely a function of the mechanics and hydraulics of the soil. However, in that wastewater contains organic substances, over time, an active, stable, moist biological crust layer frequently grows on surfaces. Of particular interest is the crust layer which occurs on a trench sidewall and within the nearby soil, especially when the layer tends to block openings in leaching system conduits.

The crust, also commonly called a biomat or biocrust, is an organic layer, typically 0.5–3 cm thick. It is normally less permeable than the surrounding soil. Thus, the biomat often significantly determines the long term steady state infiltration capacity of a leach field. The biomat also serves as a filter for bacteria and some suspended solids. In a properly functioning system, the surrounding soil remains desirably unsaturated and aerobic, thus enabling antibiotic attack of any pathogenic bacteria, and more importantly, chemical reactions involving free oxygen. Biomat is thought to aid in filtering things which enter the influence zone, Nitrogen, discharged in human waste, is characteristically passed through any biomat, predominantly as ammonium ($NH_4^+$), to be nitrified, or converted to nitrate ($NO_3$) form, in the aerobic environment of the influence zone and adjacent soil. Foreign constituents in the waste water may also sorb and or react with soil constituents; or they may ultimately be only diluted upon return to the ground water. As the waste water is renovated in the influence zone, it moves mostly outwardly and downwardly toward the ambient water table in the earth, Some water may move upwardly into the vadose above the trench by capillarity, evaporative-uptake and plant-uptake. It is usually required that the bottom of the leach field trench be a particular distance above the ambient water table, because sub-optimal sewage treatment conditions exist in the extremely moist soil, the capillary fringe, just above the water table.

In a properly designed, used and maintained septic tank disposal system, once biochemical equilibrium is reached, the capacity of the Icach field remains stable insofar as infiltration or leaching capacity. However, too frequently, a septic tank system will demonstrate insufficient infiltration capacity. Typically, a failure is manifested by escape of wastewater to the surface of the soil, or by a substantial backing up of sewage in the sewer line, One cause of failure can be gross flow of solids from the septic tank into the leach field piping or chamber system, and blockage of the perforations in such components. The typical best remedy for such is to replace or extend the lcach field. Failure can also be manifested by an inability of a given system to handle normal peak loads of sewage which were handled in the past; and by inadequate purification of the wastewater in the influence zone, resulting in pollution of the groundwater. And, even if a system has not failed, it is desirable to guard against failure by having the greatest economically feasible margin of safety against failure, Among the known causes of some Nilures are the following. The design of the system has become inadequate for the current conditions, either due to growth of a very heavy biomat, a changed character of wastewater, or changed conditions within the soil in the influence zone. For instance, the biological oxygen demand (BOD) of the waste water may have been increased, or the ambient soil conditions changed, so that the desired biochemical conditions for stable aerobic function in the influence zone are no longer obtained. An accumulation of unreacted wastewater within the influence zone limits oxygen transport. Thus, a cascading type of failure mode may ensue, wherein the influence zone gets bigger and bigger as it gets less and less effective.

Thus, there is a need for alternatives to the costly or sometimes physically impossible remedy of adding to or replacing the leaching system. And, if good technology is at hand, the possibility arises for putting in a smaller system initially and reducing cost, for providing greater margin of safety in any given system, or for allowing growth in use of an existing system.

Various approaches to enhance the capacity of leaching systems have been tried, reflecting different concepts of both failure and remedy. Chemical remedies in the forms of solvents, enzymes, and other proprietary formulations, for deposit into the sewer line with sewage, are commercially sold, but most are disdained or ignored by professionals. U.S. Pat. No. 5,588,777 of Laak discloses the injection of soap into the leach field. U.S. Pat. No. 5,597,264 of Laak discloses a method of periodically back flushing the leach field with water. U.S. Pat. No. 4,333,831 of Petzinger describes the type of problem mentioned above, solving it by using evaporation chambers in substitution of any leach field. U.S. Pat. No. 3,907,679 of Yost describes a system in which low pressure air is forced through a septic tank and then into a long coil of waste water piping, so waste water evaporates into the air and is discharged to atmosphere. U.S. Pat. No. 3,698,194 of Flynn describes how air is blown into a conduit of a leach field and vented from risers at the remote end of conduit, to cause evaporation of liquid in, and to dry out grease in, the conduit, during periods when the conduit is not being used for sewage treatment. U.S. Pat. No. 4,013,559 of Johnson describes how air is introduced into the septic tank, flowed through unique vertical concrete panel leaching system units, and then discharged to atmosphere, to encourage aerobic conditions in waste water within the panels. However, none of these prior art technologies seem to have found wide spread use. Thus, there is a continuing need for new ways to enhance the design and performance of leaching fields, both as they are originally installed and for when there are in need of rejuvenating.

SUMMARY

An object of the invention is to provide means for improving the function of septic tank type disposal systems and leach fields, to remedy failures, or forestall failure, or improve performance, in ways which are economical and practical. A further object of the invention is to effect desirable biochemical and physical conditions within the influence zone of a leach field. A still further object is to provide a way of sustaining or rejuvenating leach field performance while at the same time enabling continuous use of a septic tank type sewage system.

In accord with the invention, when wastewater is flowed from a primary sewage processing unit, such as a septic lank, through a conduit, and into an influence zone in the soil, as, comprised of air or other biochemically active gas, flows between the conduit and the influence zone, thereby making an effective physical and or chemical change in the zone. In furl accord, the flow of active gas is sufficient in amount to make the composition of gas within the influence zone effectively different from the composition which exists therewithin, in the absence of such flowing. Thus, if the leach field is functioning properly, the invention maintains or improves such; and, if the field is failing, the invention will restore part or all of the function, In one embodiment, air flows from a conduit, into and through the influence zone, in the same direction as the waste water flows. In another embodiment, air flows from the influence zone and into the conduit In both embodiments, a pressure differential is established by an air mover such as a blower or vacuum pump.

In a preferred embodiment, a conduit is pressurized relative to atmosphere, and air flows through the influence zone, the adjacent soil, and ultimately back to atmosphere. If the influence zone is saturated, the pressure of air causes the water in the influence zone to move away from the conduit and the zone is de-saturated. In another embodiment, air flows in the same manner, but as a result of a sub-atmospheric pressure (vacuum) which is created within an auxiliary pipe buried in the soil adjacent to or beneath the trench in which the conduit runs. In preferred practice, for a sewage system embodying typical conventional soils, the differential air pressure between the conduit and atmosphere is at least 2.5 mm water column, to produce a biochemically significant flow into the influence zone. In further accord with the preferred process of the invention, the influence zone is substantially anaerobic in character, and flowing of air or active gas causes the change so that predominantly aerobic. In still further accord with the invention process, the quantity of air or other gas which is flowed into the influence zone provides oxygen is substantially in excess of the stochiometric quantity which is required for oxidation of the oxidizable constituents in the waste water, as such constituents arc typically determined measurement of Oxygen Demand, in particular Biological Oxygen Demand (BOD). Optionally, a gas or liquid substance is added to the air to enhance biochemical activity.

In another embodiment of the invention, air flows from a pressurized auxiliary pipe buried in the soil adjacent the trench, and into a conduit vented to atmosphere. Alternately, the auxiliary pipe is vented to atmosphere and the conduit is connected to a vacuum pump. When there is a buried auxiliary pipe, a membrane is optionally placed within or on the soil, to control the direction in which air travels from or to the soil surface. The air flow of the invention may be maintained continuously or intermittently, with and without simultaneous flow of waste water. in a preferred practice of the invention. To ensure good functioning of a system, a low volume of air is continuously flowed into the sewage system and the air moves through the influence zone contemporaneously with waste water.

In further accord with the invention, apparatus for treating sewage is comprised of a primary unit, such as a septic tank or other kind of reactor, for primary processing of the sewage; a leach field, for receiving waste water effluent of the primary unit, where the leach field is comprised of a trench in the soil, a conduit within the trench, and soil adjacent the trench comprising an influence zone; and a means, such as a blower or vacuum pump, for producing a pressure differential between the conduit and the adjacent soil, where the pressure differential is sufficient to either force water from the soil, or to create biochemically significant gas flow into the influence zone.

In preferred apparatus embodiments, a valve, more preferably a check valve, is placed in a pipe line of the sewage system, to confine the effect of pressure or vacuum to localized parts of the sewage system. In one instance, there is a check valve in the sewer line downstream of the stack vent and upstream of the point at which pressurized air is injected. In another instance, there is a check valve in the pipe running to the distribution box or a distribution pipe and air pressure is injected into the conduits. In still other embodiments, pressure or vacuum is applied to the sewer line running into the septic tank and a check or other valve is present upstream of the point of connection to the sewer line of the source of differential pressure, such as a blower or vacuum pump. The blower is optionally in the stack vent of the system. When the differential pressure required to achieve the desired effect on the influence zone is sufficiently low to make it practical, the check valve which is used is a water-filled portion of the sewer line, such as U-trap or J-trap. Use of a check valve enables use of the system for processing sewage simultaneously with air being flowed into the leach field. A check valve bypass line, temporary storage reservoir and pump are optionally in the sewer line. In another embodiment, air is introduced into the bottom of the leaching trench by a pipe diffuser or by pipes which run lengthwise within the trench. The duration or periods during which air is flowed is optionally controlled by a control system which senses the composition or pressure in vicinity of the influence zone or elsewhere in the sewage system.

The invention is effective in improving the operation of leach fields in a cost-effective way. Leach field performance and biochemistry are improved and maintained through use of the system. The invention can be applied to existing installations and new installations.

The foregoing and other objects, features and advantages of the present invention will become more apparent from the following description of best mode embodiments and accompanying drawings.

DESCRIPTION

Figure 1:
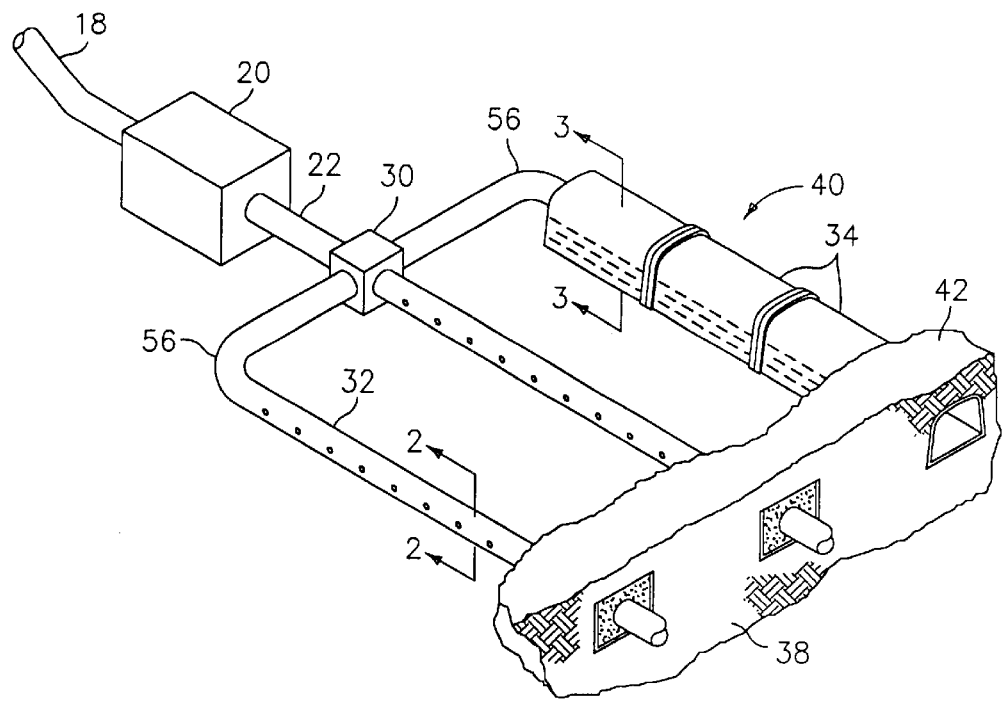
FIG. 1 is a perspective view of the basic elements of a prior art septic tank sewage system, having a composite of leaching field trench types.
Figure 2:
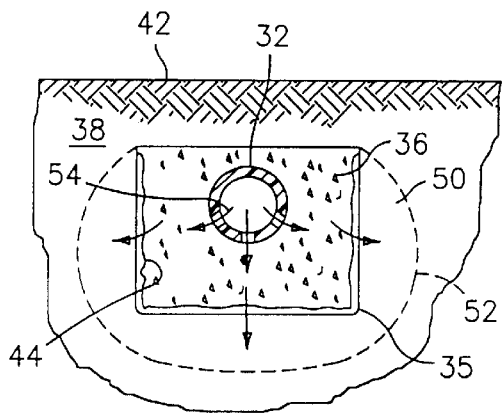
FIG. 2 is a elevation cross section through the pipe and stone filled trench portion of the leach field of the system shown in FIG. 1.
Figure 3:
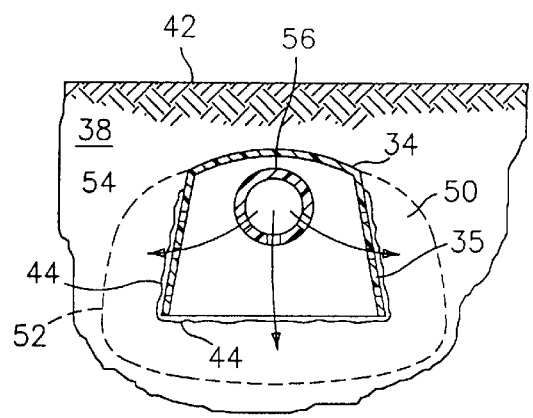
FIG. 3 is a elevation cross section through the arch shape leaching chamber-filled trench portion of the leach field of the system shown in FIG. 1.

Reference should be made to the Background section hereof for a description of various components, processes and environment which relate to both typical septic tank sewage systems and the invention. FIG. 1 illustrates components of a typical septic tank sewage system, familiar in the prior art. Sewage flows through sewer line 18 from a dwelling or other source to a septic tank 20. Wastewater flows from tank 20, through pipe line 22, to distribution box 30; and, then through distribution pipes 56 to the leach field 40. FIG. 1 shows a composite of two familiar types of leaching field construction. FIGS. 2 and 3 respectively show elevation cross section views through each of the two types. In two branches, or laterals, of the leach field 40 which is shown, a trench 35 is filled with crushed or naturally small stones 36 typically about 2.5 cm in dimension, (hereafter referred to as "stone"); and, a perforated pipe 32 distributes waste water along the trench. The waste water issuing from the pipe may be temporarily stored in the voids within the stone; and, as indicated by the arrows 54, it then flows into the soil 38 (also called soil profile) beneath the surface 42 of the earth. A typical biomat 44 forms on and within the surface of the trench. Additional biomat, not shown, will typically be present on the stones in the trench, and may be present to such an extent as to run like a membrane across stones which lie at the perforations or openings of the pipe. While typical, a biomat will not necessarily be present in a sewage system.

Referring to FIG. 3, in one branch, or lateral, of the leach field 40, the trench is filled by a string of interconnected molded arch shaped plastic leaching chambers, such as Infiltrator® chambers. In many respects the functioning of the chamber system is similar to the stone filled trench and thus will not be repeated. Waste water flows into the hollow interior of the chamber from pipe 56, where it may be stored temporarily, and it then flows into the soil, out the open bottom and through perforations in the sidewall, as indicated by arrows 54. The chamber defines and maintains the trench, and provides the conduit means for distributing waste water along the trench. Sometimes, a pipe runs along the chamber interior peak to abet distribution of waste water within a string of interconnected chambers. The side walls of trench 35 are defined by the chamber walls and the bottom is parallel to the base of the chamber. Sometimes, the trench is made larger than the chamber, and the chamber is surrounded by crushed stone.

In both types of popular leach field constructions the infiltration rate into soil is often limited at least in part by the presence of one or more biomat layers. And, in both types there will be within the soil adjacent to the trench an influence zone 50, having a nominal outer boundary 52, where the waste water is (or should be, in a properly functioning sewage system) largely renovated, or biochemically converted into a more environmentally benign form, prior to re-introduction into the ground water. The geometric definition of the influence zone is somewhat arbitrary and it can vary in dimension with time, as will be appreciated from the discussion in the Background and herein. In the drawings here, the outer boundary 52 is imaginary and not intended to represent any limiting dimension or proportion. While the invention is described in terms of soil of the earth, it will be understood that such term comprehends installations comprised in whole or part of artificial porous material such as sand and gravel and other particulate media.

The FIG. 1 system includes a typical distribution box 30 which is intended to balance flow between the branches of the system. In some septic systems there is only one branch, or several legs of the leach field are connected in series, in which case the distribution box is omitted, and the invention will be understood as being applicable in obvious ways to such systems. There are other commercial and non-commercial devices which are useful in substitution of the stone filled trenches and chambers in leach fields; such as for instance, concrete galleries, dry wells and small bore piping having spaced apart holes. In the generality of the invention herein, chambers and stone-trench pipes, dry wells, galleries, and all other substitutional devices - whether surrounded with small stone or buried directly in soil, are all considered conduits of fluid, within a context that some serve other functions as well. Cesspools and injection wells are also considered as comprising conduits and as functioning in part at least as leach fields. Most of the rest of the description here uses the example of leaching chambers.

Figure 4:
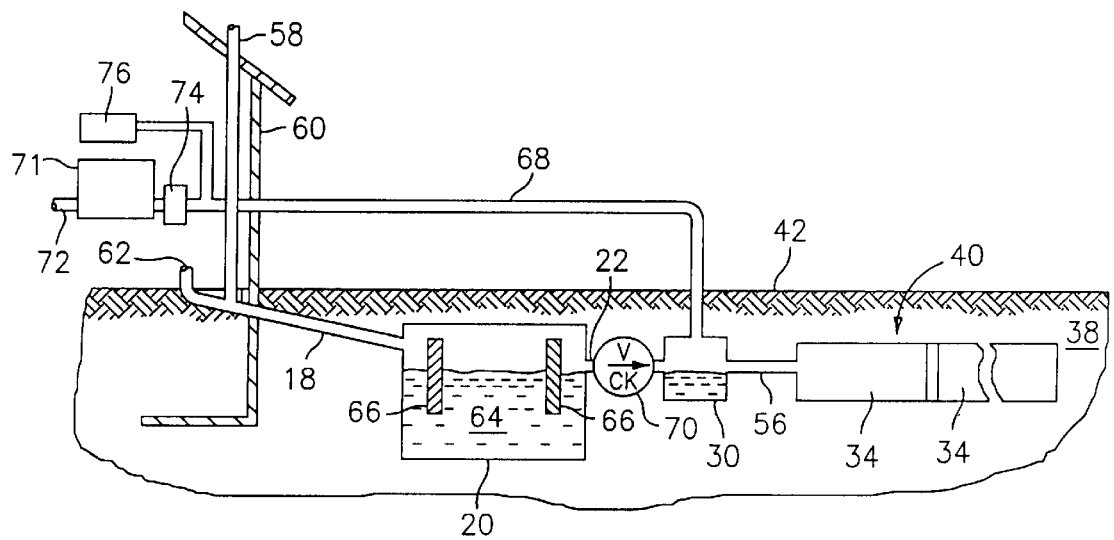
FIG. 4 is a semi-schematic, part-cross sectional, side elevation view of a septic tank type sewage system having means for creating positive pressure gradient and outward air flow in the soil adjacent the leach field trench.

A main part of the invention comprises pressurizing or evacuating leach field conduits, relative to atmosphere. Pressurizing is described first. FIG. 4 shows a semi-schematic side elevation view of a gravity flow septic tank system, which is an improvement on the essential system shown in FIG. 1. A sewer line 18 runs downwardly from building 60 to septic tank 20. Sewage from an unshown sanitary appliance or other source is introduced into inlet end 62 of the sewer line. Gases which come up the sewer line from the septic tank are vented through stack vent 58 which protrudes above the building roof When sewage 64 flows into the septic tank, baffles 66 prevent floating solids from moving to the effluent exit pipe 22. Waste water which is produced as a result of the primary processing in the septic tank flows through check valve 70, into distribution box 30, and then into leach field 40 which is comprised of parallel strings of leaching chambers 34, one of which is shown. Blower 71 causes pressurized air, drawn through air inlet pipe 72 to flow down pipe line 68 and into the distribution box. Check valve 74 protects the blower from back flow of sewage and smelly gas. An odor-absorbing charcoal filter may optionally be used with or without the check valve.

When the blower 71 is activated, the air pressure increases in the leach field. Check valve 70 prevents flow backward up effluent line 22. Referring to FIG. 4, with reference to FIG. 2 and FIG. 3, the pressure within the leaching chambers is raised sufficiently to cause flow of air through the biomat 44, if any, and through the portions of the trench walls to which air passing through the chamber walls has access. The air flows into the influence zone 50. From there, the air may flow in various directions within the soil 38, ultimately escaping from soil surface 42 to atmosphere. Thus air flows serially through the conduit interior, the trench wall, and the influence zone, in the same direction as waste water flows. Should there be a substantial quantity of water in the soil of the influence zone when the blower is started, the pressure of the air will desirably hasten the flow of water out of the influence zone. Some air may move directly upwardly from the trench interior to the surface. If the soil above the trench is saturated, upward flow is helpful. Otherwise, it is not particularly desired nor effective. In some systems, the soil near the surface either is, or may be compacted, and flow is thus inhibited. A membrane can be placed in the soil or on the surface above the trench to inhibit the upward flow. Since the Infiltrator® chamber top is not perforated, it tends to helpfully inhibit upward flow, compared to a stone trench which is covered with a porous fabric or the like.

The air flow into the conduit is maintained for a desired time, according to the result sought and obtained. After a time, air flow may be ceased, so the system resumes its normal operation; or, the system may be used during the time of air flow, as described below. Typically, a low power centrifugal blower is sufficient for producing the pressure differential which induces flow through the soil. The means for providing pressurized air will depend on the resistance of the air flow path. A regenerative type blower is used if a relatively high pressure is needed. Alternately, other means for flowing air may be used, such as blowers, fans, compressors, etc., according to the air moving performance required and the price of the component. Unless stated otherwise, all pressures stated herein are gage pressures, i.e., relative to atmosphere.

Biomat is normally anaerobic. To the extent such is present, air flow will tend to make it at least temporarily aerobic, thus engendering desirably different biological or chemical reactions which alter and reduce the biomat. In one mode of the invention, air is forced into the influence zone and beyond, along the same general flow paths which waste water has. Obviously, to the extent the influence zone and adjacent soil are saturated, forcing air into them will tend to unsaturate them. To the extent the influence zone is not appropriately aerobic, the flow of air tends to make it so. If there is an accumulation of oxygen-demanding constituents within the influence zone and surrounding soil, they will be desirably oxidized and reduced in amount. To the extent there is excess undesirable gas in the soil, such as methane, carbon dioxide and hydrogen sulfide, they will be incorporated into the air stream and carried away, e.g., by diffusion in accord with the law of partial pressures; and, their production will be selectively affected by the changed environment.

Thus, in synopsis, the invention process maintains or improves, as the case may be, the function of a leach field by (a) a physical (mechanical, pneumatic, hydraulic) effect; and (b) a chemical and or biological effect, which for simplicity if referred herein to as a biochemical effect, or in related fashion, to a change in biochemistry.

With respect to the biochemical effect, it is generally accepted that in a major way the efficacy of the influence zone in treating waste water depends on the soil within the zone comprising a predominantly aerobic environment, as such is contrasted with an anaerobic environment. In a typical failed system where for one reason or another the influence zone is anaerobic, the capability for treating waste water is as little as one-tenth that of a desirable aerobic environment which enables aerobic metabolism and oxidation. An aerobic environment is said to exist when the oxygen tension is sufficient to predominantly sustain the growth of aerobic bacterium. See Chapter 10 of the textbook of R. Atlas, "Microbiology, Fundamentals and Applications," MacMillan Publishing Co., New York (1984). For this description, an aerobic soil is one which is macroscopically aerobic, e.g., the preponderance of the volume of the soil of interest has oxygen tension sufficient for sustaining predominantly aerobic bacterium. An anaerobic soil in this description is one which is not aerobic. Nonetheless, within a mass of aerobic soil, such as the influence zone, the environment may vary from point to point, and anaerobic conditions can exist within a predominantly aerobic environment. For example, anaerobic micropores may be present within an array of aerobic macropores.

The gross environment in the influence zone can be looked at in another way, according to principles of stoichiometry. As is conventional in sewage flow analysis, wastewater can be characterized according to Oxygen Demand. Oxygen Demand is a characterization of how much oxygen is needed to effectively treat the oxidizable constituents in the wastewater to make them environmentally benign. Oxygen Demand is usually divided into two constituents, namely Biological Oxygen Demand (BOD) and Chemical Oxygen Demand (COD). COD is commonly measured by the so-called Hach Method 8000. For sewage systems associated with habitations, BOD is the commonly used parameter of interest. It is commonly measured in accord with United States Environmental Protection Agency Standard 405.1. Stoichiometry, as applied here to oxygen demand, refers to the chemical balance between an oxidizable material and oxidizer, in this instance, within the influence zone. If the influence zone receives a quantity of air which is stoichiometric, it means the quantity is exactly that which is necessary for complete theoretical oxidization of the oxidizable matter in the zone. In real situations, there are imperfect mixing and other influences, and to achieve full oxidation, some excess air (oxygen) is required. Thus, from this viewpoint, the desired aerobic influence zone will be characterized by oxygen-bearing gas flow over time, e.g., hours, which is in substantial excess of stoichiometry for the oxidizable constituents of the wastewater entering the zone over the same time. The excess stoichiometric air flow can derive from artificial means, such as through use of the invention, by natural means such as migration through permeable soil, or by a combination of those. As an example of such practice, for the system referred to in connection with Table 1, a continuous flow of 280 l/minute of injected air provides 50–100 times the stoichiometric quantity for a typical about 1200 l/day wastewater stream.

Accordingly, in the invention, air is characterized as an active gas. It maintains or alters the composition of constituents and biochemistry of the influence zone. It contains oxygen and enables oxidation. Accordingly, other active gases may be used with or in substitution of air. For instance, oxygen or ozone enriched air may be used for better oxidizing activity, and an oxygen-helium mixture may be used for a combination of greater fluidity and activity. Other gas or liquid substances, such as hydrogen peroxide, surfactants, and the like, may be introduced into the air stream in line 68 from additive system 76, by pumping or other obvious means. See FIG. 4. Alternatively, the aforesaid oxidizers or other substances may be introduced separately into the leach field conduits at the distribution box, distribution pipes 56, or chambers. Included within the effects of such additives will be to cause oxidation, to promote wetting, to act as solvents, and to promote other biochemical activity beyond what atmospheric air induces.

Thus, in one aspect of the invention, an influence zone will be saturated with water and the pressure and flow within the soil of the influence zone will lessen the saturation. In another aspect, an influence zone will initially have a composition that is deficient in oxygen, will be changed so it is substantially different, preferably, so it approximates the composition of air. For instance, a starting composition of 14–19% oxygen will be changed to 20–21%. For instance, the influence zone can have other constituents substantially different from the composition of air, e.g., carbon dioxide>2%, methane>1% and hydrogen sulfide>0.005%; and, they will be reduced by 20%, preferably much more, toward atmosphere composition. Table 1 illustrates how substantial differences are achieved in a short time. When the active gas has more oxygen or other substance than air, the soil will be accordingly affected.

In the invention process there will be a flow into the influence zone of a quantity of gas which is effective. That is, the quantity will produce part or all of the above described desired physical or chemical change. Of course, the quantity or total mass of gas put into the influence zone is a product of the flow rate and time. The flow rate of the air within the soil profile will depend on the permeability of the particular soil profile and the applied differential pressure. Generally, it is an object to keep the air mover small for purchase and operating cost and noise reasons. Thus, in one mode an air mover is run continuously to pressurize the leach field, with or without simultaneous use for sewage. In another mode the air mover is run intermittently, either during periods of sewage use, or in periods of non-use.

In a primary aspect of the invention, the amount of gas which is flowed into the influence zone is biochemically effective. Put another way, the air flow is sufficient in quantity to alter the biochemical conditions in the influence zone from those conditions which would exist in the absence of flowing, to a degree which is significant to the treatment of wastewater and soil. What is meant by biochemical or biochemistry is described above. Another primary aspect of the invention is to physically move water from the influence zone and to replace it by air, to a degree sufficient to create an aerobic region in part or all of the influence zone and or to increase the permeability of the zone. What is an effective amount can vary with the starting condition in the influence zone. Thus, an effective amount of gas will change the zone so that treatment of wastewater which simultaneously or subsequently enters the zone will be significantly better treated. Thus, one or more of the following parameters will be significantly and measurably affected: the quantity of wastewater (e.g., volume and oxygen demand) which can be handled in a unit volume of influence zone will be increased; the quality of the effluent from the influence zone will be higher in the context of common environmental standards for underground water, the permeability of the zone will be increased; the pressure necessary to cause a unit of gas flow through the zone will drop; the pressure gradient within the zone for a given flow of gas will drop; the zone will change in character from anaerobic to aerobic; the quantity of water resident in the zone at any given instant will decrease; the fraction of oxygen in the zone will increase; and, the fraction of gases associated with anaerobic activity, such as carbon dioxide, methane and hydrogen sulfide, will be decreased in the zone.

During use, the soil profile around a properly functioning sewage system leach field will be moist, inasmuch as tension and capillarity will cause water to be retained. Moisture provides a soil profile with a flow resistance significantly greater than that of dry soil. Thus, simply flowing air down a conduit of a moist leach field, where the end of the conduit is vented to atmosphere, does not achieve the objects and benefits of the invention. While the environment within the conduit may be affected, there will be insufficient static pressure within the conduit to induce flow into the surrounding soil, owing to the resistance of moist soil profile and biomat if any to flow. Obviously, if the influence zone is saturated, the chance for flow is even more remote. Experiments with perforated pipe and leaching chambers buried in sand more permeable than typical soil, using fans like those suggested by the prior art, fail to induce biochemically or physically effective flow into the influence zone. To obtain flow from a pressurized conduit which will significantly affect the influence zone of a typical leaching field within a matter of hours or days, in the desired ways described herein, the conduit static pressure will preferably be in the range 1–100 cm water column. Obviously, when a liquid is to be pushed from a saturated zone, the initial pressure required is higher than if there is no saturation. If there is saturation, and it is alleviated by air treatment, the necessary pressure drops. Likewise, when the biochemistry is changed, soil permeability tends to be increased, and the necessary pressure drops. Experiments to date for a typical system, described in connection with Table 1 below, have been conducted. Relatively low pressures and per unit area mass flow rates occur in the influence zone and surrounding soil. For instance, a blower providing 290–1400 l/minute at 2.5–100 cm water column may effectively be used in a leach field having an estimated trench area sidewall and bottom area of 74 m$^2$. A nominal flow rate soil immediately adjacent the trench wall will be of the order of 0.26–1.3 m$^3$/m$^2$/minute. Following the treatment presented in Table 1, the system is maintained by a continuous flow from a lower capacity 1700 l/minute blower at a static pressure of about 2.5 mm water column level.

Differential pressure may be applied for many hours, extending into days or continuous operation, to achieve the desired effects. Thus, it can be very difficult to detect flow and pressure gradients, the presence of which is inferred and implicit because there is a measurable change in the gas content of the soil during use of the invention, as shown by the example below. The efficacy of the invention is often best determined by desirable change in, or maintenance of, gas content of the soil. In particular, oxygen is made high, carbon dioxide, methane, hydrogen sulfide and nitrogen compounds are made or kept low, all in the direction of the content of atmospheric air or in a biochemical direction which is better than air for aerobic bacterium.

The apparatus in FIG. 4 may be modified somewhat to make an alternate embodiment in which a vacuum, instead of pressure, is applied to the distribution box, distribution pipes or chambers of the leach field. Check valve 70A is replaced by a manual or motorized valve. The valve is closed during vacuum operation—assuming the vacuum level is such that it would unacceptably draw the contents from the septic tank. Any liquid drawn toward the vacuum pump is appropriately trapped by common means, and the liquid is re-introduced into the sewer line or septic tank. When a vacuum is applied, air is drawn from the surface of the earth, through the soil, the influence zone, any biomat, and into the chamber, in ways which will be appreciated from the other description here. The air drawn from the system by the vacuum pump may be exhausted to atmosphere. Thus, there is serial flow which is the reverse of that which is described when the conduit is pressurized. The leaching system cannot be used for processing waste water from the septic tank during the time it is placed under vacuum.

Figure 5:
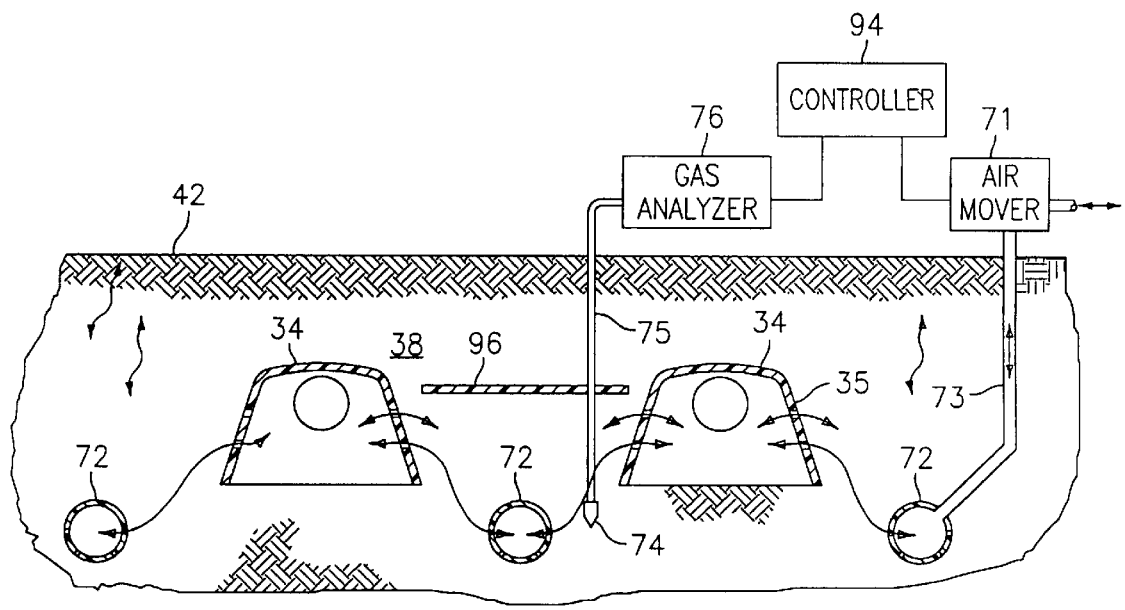
FIG. 5 is a semi-schematic cross sectional end view of a portion of a leach field, analogous to the views of FIG. 2 and 3, showing how pressure-vacuum auxiliary pipes are buried in the soil laterally adjacent the chamber-filled leach field trenches. It also schematically illustrates an associated control system.

With reference to FIG. 5, in another embodiment of the invention, one or more pressure-vacuum perforated pipes 72 (called auxiliary pipes hereafter) are installed, either as original equipment or as retrofit, in proximity to, and parallel to, the chamber-filled trenches 35. Air is either drawn from the pipes 72 or forced into the pipes 72, so that the leach field is beneficially affected. In one mode, pipes 72 are connected to a vacuum pump and gas is pulled from the soil. Appropriate common traps and trap emptying means are used to handle any wastewater that is drawn into the auxiliary pipes and to the pump, and the trapped water is recycled to the septic tank or leach field. The evacuation of pipes 72 pulls air from the chambers to the extent they are in communication with atmosphere by means of vents in the distribution box (e.g., in substitution of line 68) or chambers, or through the septic tank and stack vent 58, consistent with other discussion herein.

When auxiliary pipes are vented, air will be drawn from the earth surface 42 downwardly through the soil 38, as indicated by arrows in the Figure, according to the vacuum level, the permeability of the soil and conditions inside the chambers. Preferably, there is significant flow through the chambers and trench walls, to replicate to a degree the effect achieved when the chambers are pressurized, as described above in connection with FIG. 4. To encourage such, auxiliary pipes 72 are placed sufficiently close to the trenches/chambers, and deep enough, to create a pressure gradient across the biomat if any and within the influence zone. As shown in FIG. 5, a membrane, such as plastic sheet 96, is optionally placed in the soil profile above the pipes 72 to limit downward flow of air in between the chambers. When the chambers are not vented to enable air flow directly from atmosphere to the chamber interior, the membrane tends to cause the air to flow from surface 42 towards, into and through, the chambers. In one alternative, the membrane is a layer of relatively impermeable natural material, laid within the indigenous soil. In another alternative, the membrane is placed on the earth surface 42. Preferably, the membrane runs substantially horizontally; in other modes, the membrane may run vertically or at an angle with or without a horizontal membrane. In still another alternative, the surface of the earth is compacted or otherwise treated to lessen permeability and to thereby functionally create a membrane.

Figure 6:
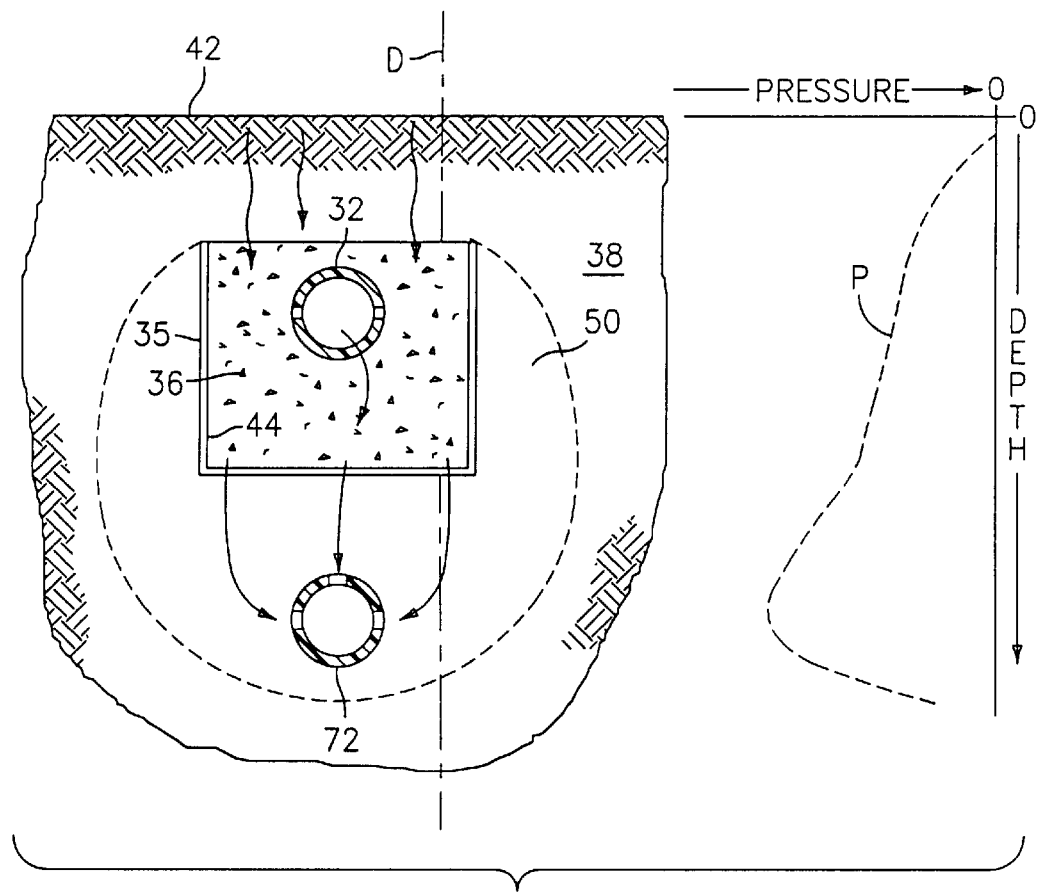
FIG. 6 is a view analogous to FIG. 5, showing one of a plurality of pipe and stone filled trenches having an underlying auxiliary vacuum pipe; together with a graph showing how negative pressure varies with depth within the soil and apparatus shown in the left of the Figure.

FIG. 6 shows a stone filled trench and pipe 72, together with a coordinated graph showing the estimated nominal variation in pressure P versus depth from the surface. The pipe 72 is beneath and parallel to a stone filled trench 35 and evacuated. A sub-atmospheric pressure gradient is established along the arbitrary vertical reference line D, as indicated by the dashed line P on the right side of the Figure. The pressure gradient induces the air flow indicated by the arrows on the left side part of the Figure. The air flows through the soil above the trench, more freely through the spaces amongst the stones, and then vertically down through the soil beneath the trench, and into the pipe. Corresponding pressure gradients and flows will be inferred for chambers having evacuated auxiliary pipes directly below.

In an alternate embodiment of use construction in accord with FIG. 6, auxiliary pipes 72 are pressurized to thus create a positive pressure gradient and related flow within the soil. This will be essentially the inverse of the phenomena just described for evacuated pipes. Thus, the pressure in the soil in vicinity of the trench, chamber, or pipe, as the case may be, will be supra-atmospheric and air will flow into the pipe and upwardly through the soil profile to the chamber and or soil surface. When the pipes 72 are beneath the influence zone, pressure or upward air flow may also retard the downward flow and escape of waste water to ground water, which could be either desirable or undesirable depending on reactions in the influence zone.

Figure 7:
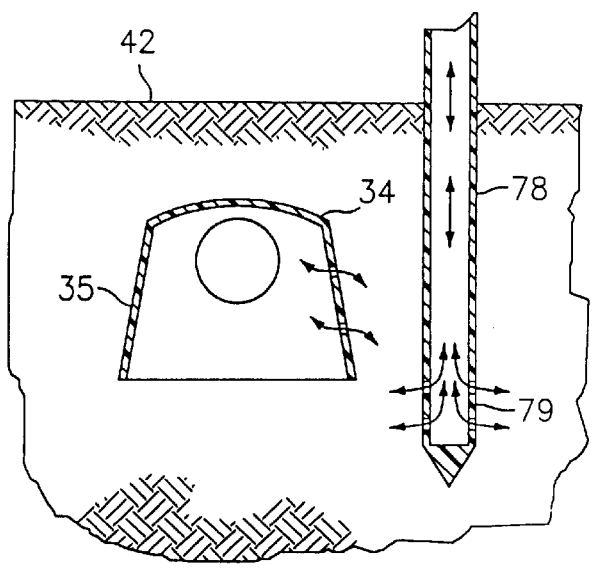
FIG. 7 is a view analogous to FIG. 5, showing one of a plurality of chamber filled trenches with one of a multiplicity of spaced apart pressure-vacuum auxiliary vertical pipes adjacent the trench.

FIG. 7 is a fragmentary picture which will be understood from its analogy to FIG. 5. FIG. 7 shows one of a plurality of spaced apart vertical pipes 78 which is positioned adjacent one or more of the trenches, along the length of the trench, in place of the horizontal pipes 72. The pipes 78 have perforated lower ends 79, to enable air to flow into and from the soil. As for other like Figures, the flow of gases, according to whether the pipe is pressurized or evacuated, is indicated by the double-headed arrows. Pipes 78 may alternatively be angled downwardly so the lower pipe ends are positioned beneath the trench, rather than adjacent to it as shown. Thus, the term "vertical pipe" will encompass pipes which are generally running in an upward direction, whether true vertical or at an angle to such, in which case they are only generally vertical. The advantage of the use of vertical injection or suction pipes is one of easy retrofit. Combinations of horizontal vertical (and angled) pipes and means for interconnecting them to the source of pressure or vacuum will present themselves. The horizontal or vertical aeration pipes shown in FIG. 5 or 7, and the diffusers of FIGS. 14 and 15 discussed below, may be installed proximate or within individual trenches, or portions thereof, rather than generally throughout an entire leaching system, to cope with a localized problem.

The operation of the FIG. 5 embodiment, as well as operation of other embodiments of the invention, may be controlled as indicated by the schematic control diagram portion of FIG. 5. The composition and or pressure of gas in the influence zone or soil adjacent the zone is sensed using a gas sensor comprised of a probe 74 and an analyzer 76. The analyzer provides a first signal to controller unit 94 which compares the first signal to a desired reference point (characteristic of a desired reference gas composition or pressure) and provides a second signal to the air mover 71, to thereby modulate flow of air to or from pipe 68 and pipes 72, according to the difference between the first signal and the reference point. The air flow may be modulated by stopping and starting the air mover, or by increasing or decreasing the pressure. Pressure is alternatively measured within the conduit or something connected to it, because as indicated, a drop in static pressure for a given flow is a measure of leach field improvement. The reference composition is selected in accord with the teachings herein. For instance, the reference composition may be such as 20% oxygen, or less than 1% carbon dioxide. The reference pressure is selected in relationship to other parameters which measure the performance of the influence zone, and based on accumulated experience with like sewage systems.

Figure 14:
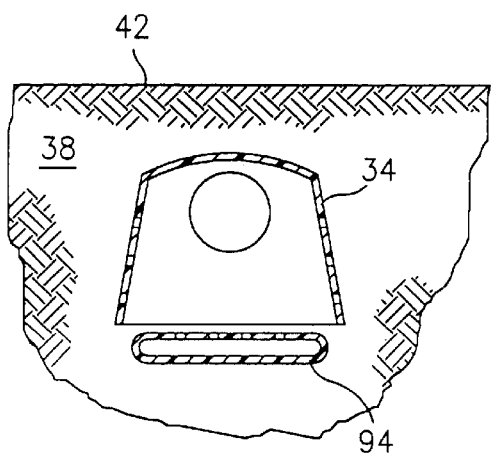
FIG. 14 is a view like FIG. 3, showing an oblong air distribution diffuser lightly buried in the soil beneath the bottom of a leaching chamber.
Figure 15:
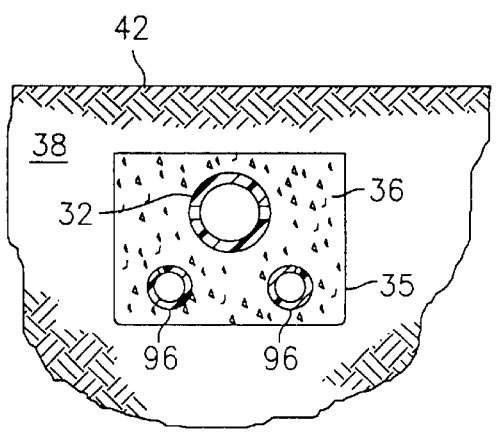
FIG. 15 is a view like FIG. 2, showing two air distribution perforated pipes within the stone of the trench.

FIG. 14 is a view like FIG. 3, showing a chamber having a oblong cross section pipe 94, called here a diffuser, buried at shallow depth beneath the soil at the base of the chamber. Diffuser 94 may be alternatively laid on the soil at the base of the chamber. Diffuser 94 is connected to a source of pressurized air, so pressurized air is forced into the chamber in an evenly distributed way, to the achieve the desired effect which has been described in connection with FIGS. 5–7. FIG. 15 is like FIG. 14 and FIG. 3, showing a perforated waste water pipe 32 in a stone filled trench 35. Running along the length of the bottom of the trench are two small diameter auxiliary pipes 96 carrying pressurized air. In another alternative, the pipes 96 are shallowly placed in the soil 38 beneath the trench, in manner analogous to FIG. 14.

Referring again to the FIG. 4, further modification thereof which is useful, when the leach field chambers are pressurized, comprises using the head of effluent in the septic tank to prevent the back flow of air toward the sewer line 18 instead of check valve 70. For instance, the septic tank head may resist pressures of 2–100 cm water column. Thus, valve 70 may be eliminated. A septic tank which by design permits through-flow of air may be modified by blocking off the air passage in this aspect of the invention. In such situation, the sewage flow into and out of the septic tank may be maintained during pressurization of the leach field, assuming some increase in head at the inlet end of the septic tank is tolerable. This factor also applies to the use of a water trap valve upstream or downstream of the septic tank, discussed below.

Figure 8:
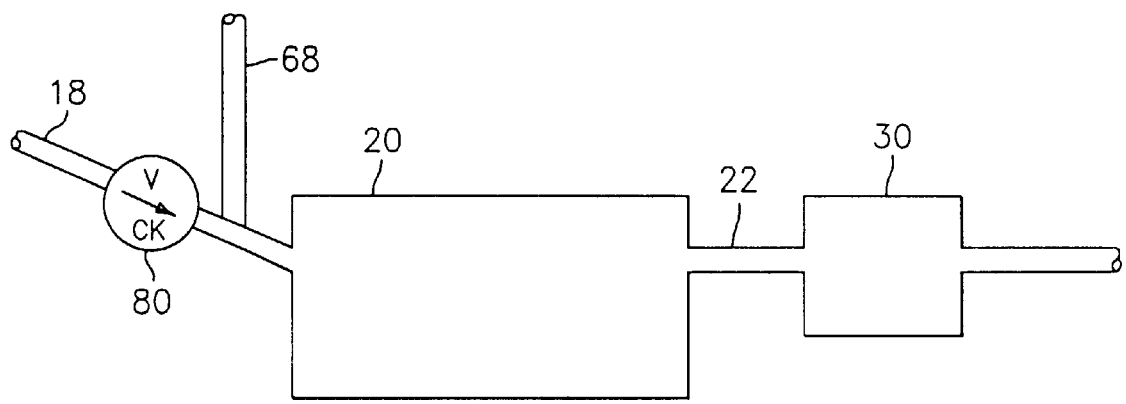
FIG. 8 is a semi-schematic elevation view illustrating how a pressurized air line and a check valve are positioned in the sewer line upstream of a septic tank through which air flows.

Another alternative system design is as follows. It is very common that a septic tank will enable unimpeded flow-through of gases, from outlet to inlet. When such is the case, the location of the check valve 70 shown in FIG. 4 for the pressurized leach field may be changed. It may be moved to sewer line 18, upstream of the septic tank, and the pressurized air line 68 may be connected between the valve and the septic tank. FIG. 8 shows such a construction in semi-schematic fashion, comprising check valve 80 in sewer line 18. Of course, the septic tank cannot leak excessively out the top if this option is to be practical. A check valve which is useful in this embodiment and others described is a common horizontal flap type check valve sold in connection with PVC sewage pipe of 7.5–10 cm diameter. Manually or power actuated mechanical valves referred to herein are likewise commercially available.

Figure 9:
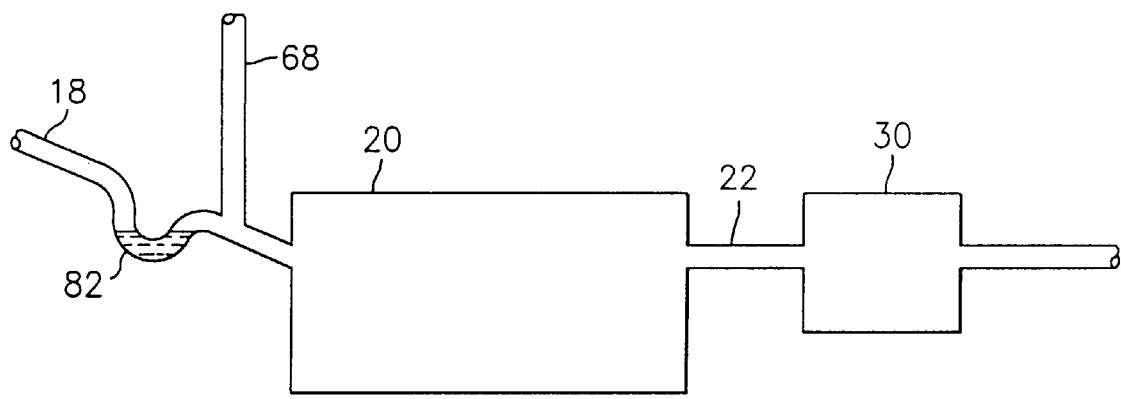
FIG. 9 is a view like FIG. 8 showing a J-trap check valve used in substitution of the mechanical check valve shown in FIG. 8.

The side elevation semi-schematic view of FIG. 9 shows another way for preventing back flow which can be used in substitution of a check valve, namely J-trap 82. The trap type is familiar for toilets and other plumbing appliances. Sometimes, it is referred to as a U-trap. Generally, the J- or U-type of traps, and any other functional equivalent, is referred to hereafter as a water trap. As illustrated in FIG. 9, sewage water is retained in the base of the J-shape contour of line 18. The asymmetrical nature of the J shape means that there is more resistance to upstream flow of a fluid, compared to downstream flow. Thus the J-trap is functions analogously to a check valve, in impeding flow of air and water in the downstream direction more than in the other direction. Obviously, the back flow resistance can be overcome by raising the pressure sufficiently high, but so can a mechanical check valve be overcome by sufficiently high pressure. Obviously, the depth of the J can be used to set the head to which the downstream part of the septic system can be subjected. In the generality of the invention involving pressurization, the valve in the sewer line functions to limit upstream movement and the valve may be a mechanical or water trap. It will be appreciated that in certain circumstances a water trap valve may be functionally sufficient and thus useful on the downstream side of the septic tank, where such has been described here.

Figure 10:
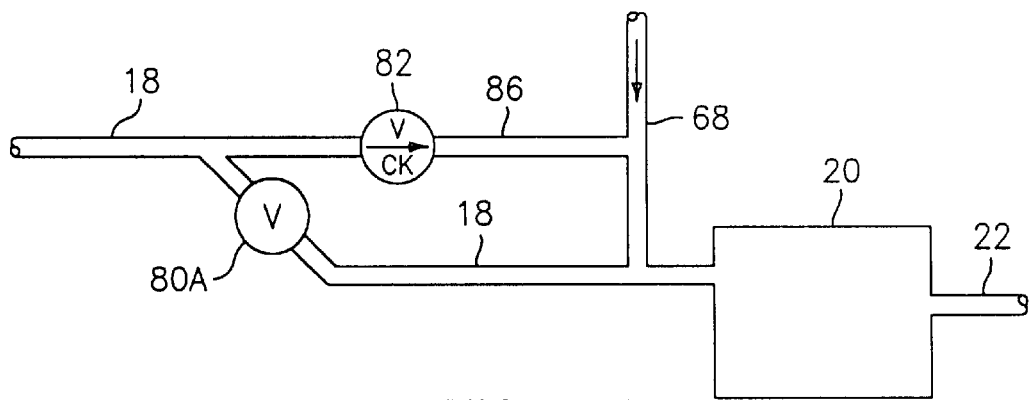
FIG. 10 is a view like FIG. 8, showing a check valve in a bypass line for a valved sewer line.

FIG. 10 is a semi-schematic elevation view of a variation on FIG. 8. The primary sewer line 18 is fitted with valve 80A. Bypass sewer line 86, with associated bypass check valve 82, provides a bypass around the valve 80A. Valve 80A is kept open during periods when there is no air pressurization of the system, i.e., during use of the sewage system as it takes place in absence of use of the invention. Thus, with appropriate pipeline angling and positioning, sewage will not consequentially pass through the check valve. This eliminates possible noise that might be heard by occupants of the building, arising from operation of check valve 82 as sewage passes through.

Figure 11:
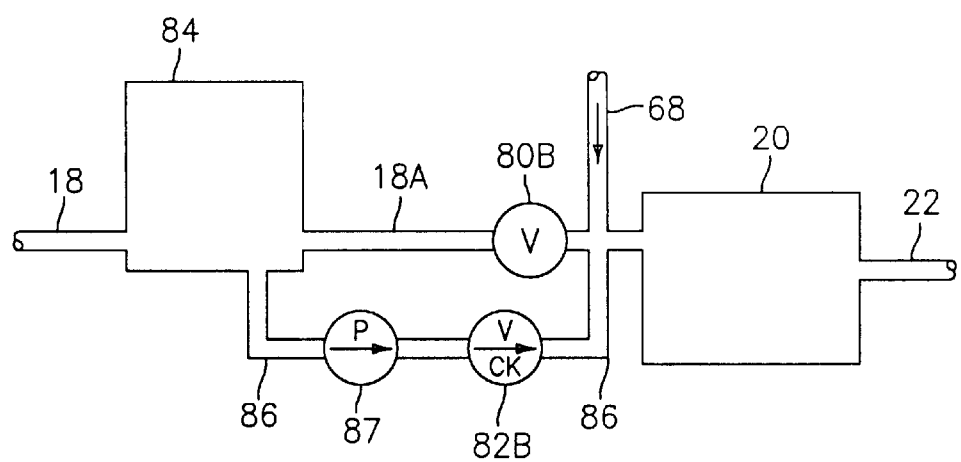
FIG. 11 is a view like FIG. 10, showing a reservoir and pump for receiving and forcing sewage downstream into the septic system while it is pressurized.

FIG. 11 is a view like FIG. 10. It shows a plumbing arrangement which is useful when the pressure in the leach field, due to air flowing down feed pipe 68, is more than the head of sewage coming down the sewer pipe can overcome. In such instance, the valve 80B in the main sewer line 18A is closed. This causes sewage coming down the sewer line 18 to accumulate in reservoir 84. By means of a reservoir level sensor system, the pump 87 forces sewage through line 86 and forces it into the septic tank. Check valve 82A prevents any back flow when the pump is not operating.

Figure 12:
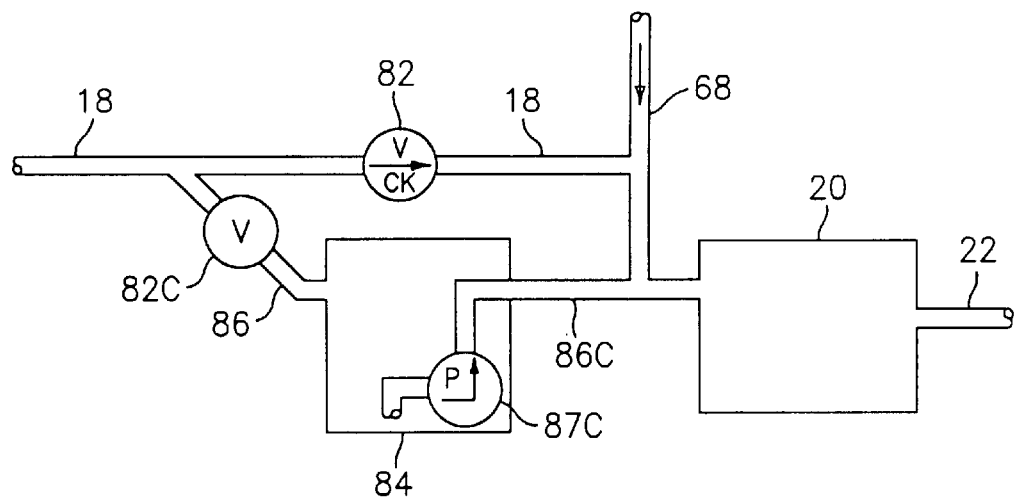
FIG. 12 is a view like FIG. 10, showing a variation on the apparatus illustrated in FIG. 11.

FIG. 12 is like FIG. 10 and shows still another plumbing variation. Flow to reservoir 84 along bypass line 86 is controlled by valve 82C. When the valve 82C is closed, sewage flows along the main sewer line through check valve 82. When the valve is opened, sewage preferentially flows down line 86 into reservoir 84 from whence, according to signals from unshown sensors, the pump 87C is activated to force sewage down line 86C to overcome the air pressure in the sewage system. The apparatuses described in connection with FIGS. 10–12 may be alternatively installed in exit line 22 or distribution line 56.

Figure 13:
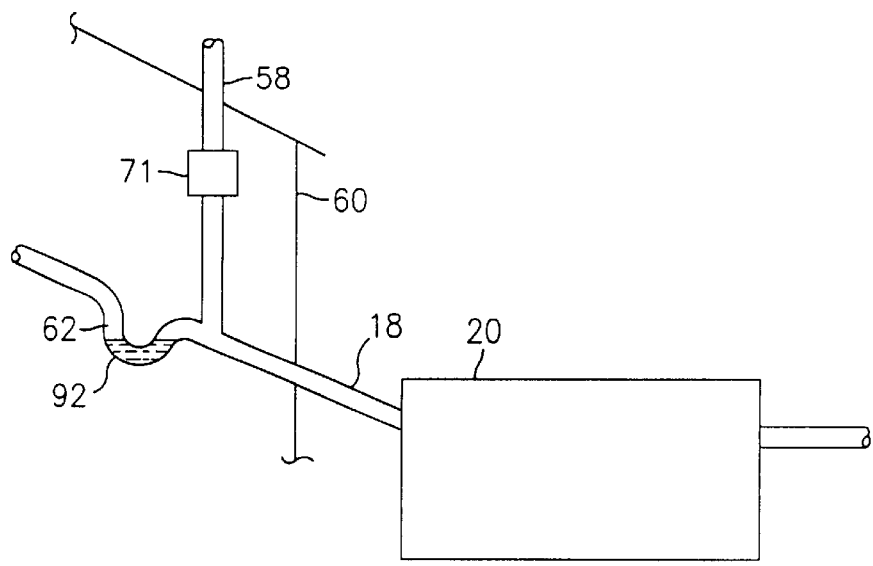
FIG. 13 is a fragmentary view like the view of FIG. 4, showing a blower positioned in the stack vent line.

The elevation view of FIG. 13 shows how a centrifugal type blower 71 can be placed in the stack vent line 58, when J-trap 92 (or a functional substitute, e.g., a plurality of appliances having integral traps) is present to prevent back flow of pressurized air, up the sewer line 18 into building 60. When actuated, the blower forces air downwardly in the stack, and into the septic tank. When not actuated, the blower allows sewage decomposition gases to escape up the stack. Particularly for retrofit purposes, the blower may be placed at the upper end of the stack vent, exterior of the building. For original installation or retrofit purposes, a prepackaged unit is comprised of a segment of pipe adapted to be connected into a sewer or distribution line, a check valve in the pipe line, and a air mover connected at its output or pressure side to the length of pipe at a point downstream of the check valve.

In the most likely way in which the invention will be used, the leach field conduits will not be vented to atmosphere along their lengths or at their ends farthest from the septic tank. However, the invention can be applied to such kinds of vented conduits. When the chambers are pressurized, there is an obvious disadvantage in that the air mover has to have capacity sufficient to achieve the necessary static pressure while accommodating the loss of air out the vent. And, as has been mentioned, in various modes of the invention, it is contemplated that the conduits will be vented through the septic tank and stack vent. For such modes, other vents into the conduits can have a positive or neutral effect.

The following is an example of the practice of the invention. Pressurized air was applied to the sewer line of a functioning single family dwelling septic tank type system. Table 1 shows selected representative measurements of composition of soil profile gas content and pressure over time. The septic tank permitted free flow-through of air, thus the pressure in the leach field conduits was the same as at the sewer line. The leach field was comprised of two 30 m serially connected lengths of perforated pipe in stone filled trench. The indigenous soil was comprised of silt, with some clay and a trace of fine sand and gravel. The soil temperature adjacent the trenches was about 13 degrees C. The arrangement was like that shown in FIG. 8, with a check valve 80 in the sewer line. The air mover was a 93 w, 1700 l/minute blower. Soil gas composition was measured using a commercial gas analyzer and a probe which inhibits infiltration of surface air. See U.S. Pat. No. 6,018,909. Pressure was measured with the same kind of probe. The applied positive pressure at the sewer line was continuous and ended at the time shown for the readings. It gradually declined as the flow increased with the passage of time. Sewage use was continued during the test, with at an estimated 1200 l/day input. Readings S7S and S7D were taken in the influence zone, respectively at depths of 30 and 75 cm from the earth surface at the end of a 30 m first trench length. Reading S1S was taken at the inlet end of the same first trench. The data show how the influence zone of the soil was desirably changed in the aerobic direction over time and how unwanted constituents were decreased. The methane reading for S6D is apparently anomalous.

TABLE 1

Soil gas composition change as a function of time for a pressurized septic system.

| Probe Location | Time Hr | Conduit Pressure mm $H_2O$ | Volume Percent | | Parts Per Million | | Influence Zone Pressure mm $H_2O$ |
| --- | --- | --- | --- | --- | --- | --- | --- |
| | | | Oxygen | Carbon Dioxide | Methane | Hydrogen Sulfide | |
| S7S | 0 | 0 | 20.5 | 0.84 | 10 | 0 | 0 |
| | 16 | 200 | 20.1 | 1.18 | 5 | 0 | 0.020 |
| | 408 | 120 | 20.9 | 0.1 | 0 | 0 | 0.010 |
| S6D | 0 | 0 | 19.1 | 2.00 | 0 | 0 | 0 |
| | 16 | 200 | 19.6 | 1.56 | 0 | 0 | 0.025 |
| | 408 | 120 | 20.4 | 0.98 | 15 | 0 | 0.020 |
| S1S | 0 | 0 | 14.3 | >5.00 | 0 | 0 | 0 |
| | 16 | 200 | 16.5 | 4.38 | 0 | 0 | 0.010 |
| | 408 | 120 | 20.9 | 0.16 | 0 | 0 | 0.030 |

While the septic tank system designs described herein are most widely used in connection with dwellings, the invention will be useful in sewage systems which process sewage streams from industrial, agricultural, food processing, commercial, etc., operations, which sewage streams present the same disposal problems as domestic sewage from habitations. In a septic tank system, the septic tank is a unit for primary processing or treatment of sewage and the leach field provides secondary processing or treatment of the sewage, as such terms are well understood in the art. Septic tanks are commonly known to comprise predominantly anaerobic environments. The invention will also be useful with leach fields which derive wastewater from sources where there is no primary units. Other devices, both aerobic and anaerobic, may be substituted for septic tanks as the primary (treatment) unit. For instance, an aerobic reactor which agitates the sewage with air may be used.

Although this invention has been shown and described with respect to a preferred embodiment, it will be understood by those skilled in this art that various changes in form and detail thereof may be made without departing from the spirit and scope of the claimed invention.

I claim:

1. A method of subsurface sewage treatment which comprises:
    (a) flowing sewage from a source in a sewer line to a primary sewage processing unit, wherein the primary unit generates wastewater;
    (b) flowing wastewater from said primary unit through the interior of a first conduit of a leach field comprised of conduits within soil;
    (c) flowing wastewater from the interior of the first conduit into an influence zone in the soil adjacent the first conduit;
    (d) providing a gas comprised of air or other active gas;
    (e) applying an air or other active gas pressure differential between the first conduit interior and the influence zone, to thereby cause said air or other active gas to flow serially through the first conduit and the influence zone; wherein, the quantity of said air or other active gas which is flowed through said influence zone and said conduit interior is an effective amount with respect to altering the biochemical or physical character of the influence zone and the treatment of wastewater therein.

2. The method of claim 1, wherein the gas flow quantity is sufficient to cause the composition of the gas within the influence zone to significantly differ from the composition of gas which is otherwise present in the influence zone, in absence of said gas flow.

3. The method of claim 2, wherein said effective amount of gas changes the influence zone from an anaerobic environment to an aerobic environment.

4. The method of claim 1, wherein said gas is flowed simultaneously with, and in the same direction as, the flow of waste water, from the interior of the first conduit and into the influence zone.

5. The method of claim 1, wherein the flowing of sewage and wastewater is temporarily stopped during the time during which the gas is caused to flow.

6. The method of claim 1 wherein the interior of the first conduit is pressurized to a pressure greater than atmospheric pressure during the time of applying the differential pressure.

7. The method of claim 6 wherein the influence zone is substantially saturated prior to the step of applying the pressure differential; whereby, the effect of the applied pressure within the influence zone causes liquid to be pushed out of the influence zone.

8. The method of claim 1 wherein said pressure differential is at least 2.5 mm water column.

9. The method of claim 1 wherein the first conduit interior is evacuated to a pressure less than atmospheric pressure while the pressure differential is applied; wherein, gas flows from the soil into the interior of the first conduit.

10. The method of claim 6 further comprising: applying said pressure differential between the primary sewage processing unit and the influence zone, to cause gas to flow serially through the primary sewage processing unit, the first conduit and the influence zone.

11. The method of claim 10 further comprising: preventing flow of gas upstream towards the source while allowing flow of sewage along said sewer line from said source.

12. The method of claim 1 further comprising: providing an auxiliary gas pipe buried in the soil proximate the first conduit; and, applying a further differential pressure between the influence zone and the interior of the gas pipe, to thereby cause said gas to flow serially through said first conduit, the influence zone, and the auxiliary gas pipe.

13. The method of claim 1 which further comprises placing a membrane in or on the soil to inhibit gas from flowing vertically upward within the soil in vicinity of the trench.

14. The method of claim 12, wherein the auxiliary pipe is located within the soil beneath said first conduit; and wherein, gas is flowed vertically within soil beneath said first conduit.

15. The method of claim 17, further comprising: evacuating the auxiliary gas pipe so gas flows from the conduit to the auxiliary pipe.

16. The method of claim 1 which further comprises: measuring the composition or pressure of gas within the conduit or influence zone, to provide a measurement; and, controlling the degree or time of applying differential pressure according to how the measurement compares respectively to a desired reference gas composition or pressure.

17. The method of claim 1, wherein the gas is air; and, wherein the influence zone contains gas having a starting composition which is substantially different from the composition of air; wherein, said effective amount significantly changes the composition of gas within the influence zone to a composition which is more nearly that of air.

18. The method of claim 1 wherein said gas is air, further comprising: adding a substance to the air to enhance the biochemical activity of the gas as the gas flows into said adjacent soil.

19. The method of claim 18, wherein said substance is an oxidizer or surfactant.

20. The method of claim 1 which farther comprises changing said pressure differential to cause said flow of gas to fluctuate.

21. The method of claim 1 which further comprises: compacting the surface of the soil which is above at least a portion of the influence zone.

22. A method of subsurface sewage treatment, wherein waste water is flowed from the openings of a conduit into an influence zone within soil, in which zone the biochemistry of the waste-water is made substantially environmentally benign by biochemical activity, and wherein said waste water is then flowed within the soil away from the influence zone, which comprises flowing a biochemically or physically effective amount of gas comprised of air or other active gas through the influence zone, wherein the gas flows to or from the interior of said conduit by passing through one or more openings in the conduit.

23. The method of claim 22 wherein said gas flows from or to the atmosphere above the surface of the soil, according to whether said gas is flowing to or from the interior of the conduit.

* * * * *